US006252542B1

(12) United States Patent
Sikina et al.

(10) Patent No.: US 6,252,542 B1
(45) **Date of Patent: *Jun. 26, 2001**

(54) PHASED ARRAY ANTENNA CALIBRATION SYSTEM AND METHOD USING ARRAY CLUSTERS

(76) Inventors: Thomas V. Sikina, 95 Main St., Acton, MA (US) 01720; Oscar J. Bedigian, 40 Laurel Dr., Hudson, MA (US) 01749; Jack J. Schuss, 8 Cedar St., Newton, MA (US) 02159

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,473

(22) Filed: Mar. 16, 1998

(51) Int. Cl.[7] ........................................................ G01S 7/40

(52) U.S. Cl. ............................................ 342/174; 342/373

(58) Field of Search ..................................... 342/174, 373

(56) References Cited

U.S. PATENT DOCUMENTS

| | | | | |
|---|---|---|---|---|
| 4,673,939 | | 6/1987 | Forrest | 342/174 |
| 4,949,090 | | 8/1990 | Tamii et al. | 342/173 |
| 5,086,302 | | 2/1992 | Miller | 342/373 |
| 5,253,188 | | 10/1993 | Lee et al. | 364/571.02 |
| 5,412,414 | * | 5/1995 | Ast et al. | 342/174 |
| 5,530,449 | * | 6/1996 | Wachs et al. | 342/174 |
| 5,543,801 | * | 8/1996 | Shawyer | 342/354 |
| 5,657,023 | | 8/1997 | Lewis et al. | 342/174 |
| 5,861,843 | | 1/1999 | Sorace et al. . | |
| 5,864,317 | | 1/1999 | Boe et al. | 342/374 |
| 5,867,123 | | 2/1999 | Geyh et al. | 342/372 |

FOREIGN PATENT DOCUMENTS

| | | | |
|---|---|---|---|
| 0509694A2 | 10/1992 | (EP) | H01Q/3/26 |

OTHER PUBLICATIONS

Aumann et al., "Phased Array Antenna Calibration and Pattern Prediction Using Mutual Coupling Measurements", Ieee Transactions On Antennas and Propagation, vol. 37, No. 7, Jul. 1989, pp. 844–850.

Aumann et al., "Phased Array Calibrations Using Measured Element Patterns", Proc. 1995 IEEE AP–S International Symposium, pp. 918–921, Long Beach, CA Jun. 1995.

(List continued on next page.)

*Primary Examiner*—Theodore M. Blum
(74) *Attorney, Agent, or Firm*—Daly, Crowley & Mofford, LLP

(57) ABSTRACT

Apparatus and method for self-contained calibration and failure detection in a phased array antenna having a beamforming network. The beamforming network includes a plurality of array ports and a plurality of beam ports or a space fed system. A plurality of antenna elements and a plurality of transmit/receive modules are included. Each one of the modules is coupled between a corresponding one of the antenna elements and a corresponding one of the array ports. A calibration system is provided having: an RF input port; an RF detector port; an RF detector coupled to the RF detector port; and an antenna element port. A switch section is included for sequentially coupling each one of the antenna elements through the beam forming/space-fed network and the one of the transmit/receive modules coupled thereto selectively to either: (a) the detector port during a receive calibration mode; or, (b) to the RF input port during a transmit calibration mode. The switch section includes a switch for selectively coupling a predetermined one of the antenna elements, i.e., a calibration antenna element, selectively to either: (a) the RF test input of the calibration system during the receive calibration mode through a path isolated from the beamforming network; or, (b) to the detector port during the transmit calibration mode through a path isolated from the beamforming network. In one embodiment, the calibration antenna element is disposed in a peripheral region of the array of antenna elements. In another embodiment, the array of antenna elements is arranged in clusters, each one of the clusters having a calibration antenna element.

12 Claims, 5 Drawing Sheets

OTHER PUBLICATIONS

Fenn et al., "Mutual Coupling In Monopole Phased Array Antennas", 1984 International Symposium Digest, Antennas and Propagation, vol. 11, IEEE Catalog NO. 84CH2043–8, Library of Congress No. 84–80882, 1984.

Aumann et al., "Application of Beamspace Techniques to Phased Array Calibration and Fault Compensation", 1991 Symposium, Antenna Measurement Techniques Association, pp. 10B–13, Conf. Date Jul. 11, 1991.

Aumann, "Correction of Near–Field Effects in Phased Array Element Pattern Measurements", IEEE Antennas and Propagation Society, AP–S International Symposium (Digest) V 1, 1997. pp. 572–575.

PCT Search Report Dated Nov. 24, 1999 in Corresponding PCT Application PCT/US 99/05502.

* cited by examiner

PHASED ARRAY ANTENNA CALIBRATION SYSTEM AND METHOD USING ARRAY CLUSTERS

BACKGROUND OF THE INVENTION

This invention relates generally to phased array antennas and more particularly to apparatus and methods used to calibrate such antennas.

As is known in the art, a phased array antenna includes an array of antenna elements adapted to produce a plurality of collimated and differently directed beams of radio frequency energy. These phased array elements may be corporate fed or space fed. In either case, the relative amplitude and phase shift across the array of antenna elements defines the antenna beam. This relative amplitude and phase state may be produced by controllable attenuators and phase shifters coupled to corresponding antenna elements or by beamforming networks disposed between a plurality of beam ports and the plurality of antenna elements, where each beam port corresponds to one of the beams.

In one such beamforming network phased array antenna system, the beamforming network has a plurality of array ports each one being coupled to a corresponding one of the antenna elements through a transmit/receive module. Each one of the transmit/receive modules includes an electronically controllable attenuator and phase shifter. During a receive calibration mode at the factory or test facility, a source of radio frequency (RF) energy is placed in the near field of the phased array antenna elements. The transmit/receive modules are sequentially activated. When each one of the transmit/receive module is placed in a receive mode and is activated, energy received by the antenna element coupled thereto is passed through the activated transmit/receive module and through the beamforming network. The energy at one of the beam ports is detected during the sequential activation. The detected energy is recorded for each of the elements of the array in sequence. The process is repeated for each of the beam ports. For each antenna element, a least mean square average is calculated for the detected energy associated with each of the beam ports. Thus, each antenna element is associated with an amplitude and phase vector. These measured/post-calculated vectors are compared with pre-calculated designed vectors. If the antenna is operating properly (i.e., in accordance with its design), the measured/post-calculated vectors should match the pre-calculated vectors with minimal error. Any difference in such measured/post-calculated vector and the pre-calculated vector is used to provide a control signal to the controllable attenuator and/or phase shifter in the module to provide a suitably corrective adjustment. The calibration is performed in like, reciprocal manner, during a transmit calibration mode at the factory or test facility.

Thus, in either the transmit or receive calibration modes, errors in the relative phase or amplitude are detected and the controllable attenuator and/or phase shifter in the module is suitably adjusted. While such technique is suitable in a factory or test facility environment, the use of separate external transmit and receive antennas may be impractical and/or costly in operational environments. For example, when the antenna is deployed in the field it is sometimes necessary to recalibrate the antenna after extensive use. Examples of such environments include, but are not limited to, outer space as where the antenna is used in a satellite, on aircraft including fixed wing, rotary wing, and tethered, and on the earth's surface.

A paper entitled "Phased Array Antenna Calibration and Pattern Predication Using Mutual Coupling Measurements" by Herbert M. Aumann, Alan J. Fenn, and Frank G. Willwerth published in IEEE Transactions on Antennas and Propagation, Vol. 37, July 1989, pages 844–850, develops mathematically and demonstrates a calibration and radiation pattern measurement technique which takes advantage of the inherent mutual coupling in an array, by transmitting and receiving all adjacent pairs of radiating elements through two independent beamformers (corporate feeds). The technique utilizes an internal calibration source.

SUMMARY OF THE INVENTION

In accordance with one feature of the invention, apparatus and method are provided for testing a phased array antenna. The antenna includes a plurality of antenna elements and a plurality of transmit/receive modules. Each one of the transmit/receive modules is coupled to a corresponding one of the antenna elements. The apparatus includes a calibration system having: an RF input port; an RF detector port; an RF detector coupled to the RF detector port; and an RF source connected to the RF input port. A switch section is included for sequentially coupling the antenna elements and the transmit/receive modules coupled thereto selectively to either: (a) the detector port during a receive calibration mode; or, (b) to the RF test input port during a transmit calibration mode. One, or more, (i.e., a predetermined set) of the plurality of antenna elements (i.e., calibration antenna elements) is also coupled to the switch section. The switch section couples each calibration antenna element selectively to either: (a) the RF test input during the receive calibration mode; or, (b) the RF detector port during the transmit calibration mode.

In accordance with another feature of the invention, apparatus and method are provided for testing a phased array antenna having a beamforming network. The beamforming network includes a plurality of array ports and a plurality of beam ports. A plurality of antenna elements and a plurality of transmit/receive modules are included. Each one of the modules is coupled between a corresponding one of the antenna elements and a corresponding one of the array ports. A calibration system is provided having: an RF input port; and RF detector port; an RF detector coupled to the RF detector port; and an RF source connected to the RF input port. A switch section is included for sequentially coupling each one of the antenna elements through the beam forming network and the one of the transmit/receive modules coupled thereto selectively to either: (a) the detector port during a receive calibration mode; or, (b) to the RF test input port during a transmit calibration mode. The switch section includes a switch for selectively coupling a predetermined one of the antenna elements (i.e., a calibration antenna element) selectively to either: (a) the RF test input of the calibration system during the receive calibration mode through a path isolated from the beamforming network; or, (b) to the detector port during the transmit calibration mode through a path isolated from the beamforming network. With such an arrangement, undesired coupling to the calibration antenna element through the beamforming network is eliminated.

In accordance with still another feature of the invention, the array of antenna elements is arranged in clusters, each one of the clusters having a predetermined antenna element (i.e, a calibration antenna element). With such an arrangement, each cluster is calibrated with the calibration antenna element in such cluster thereby enabling a relatively small dynamic range variation among the antenna elements in such cluster during the calibration of such cluster.

BRIEF DESCRIPTION OF THE DRAWING

Other features and advantages of the invention, as well as the invention itself, will become more readily apparent when taken together with the following detailed description and the accompanying drawings, in which.

DESCRIPTION OF THE PREFERRED EMBODIMENTS

Figure 1:
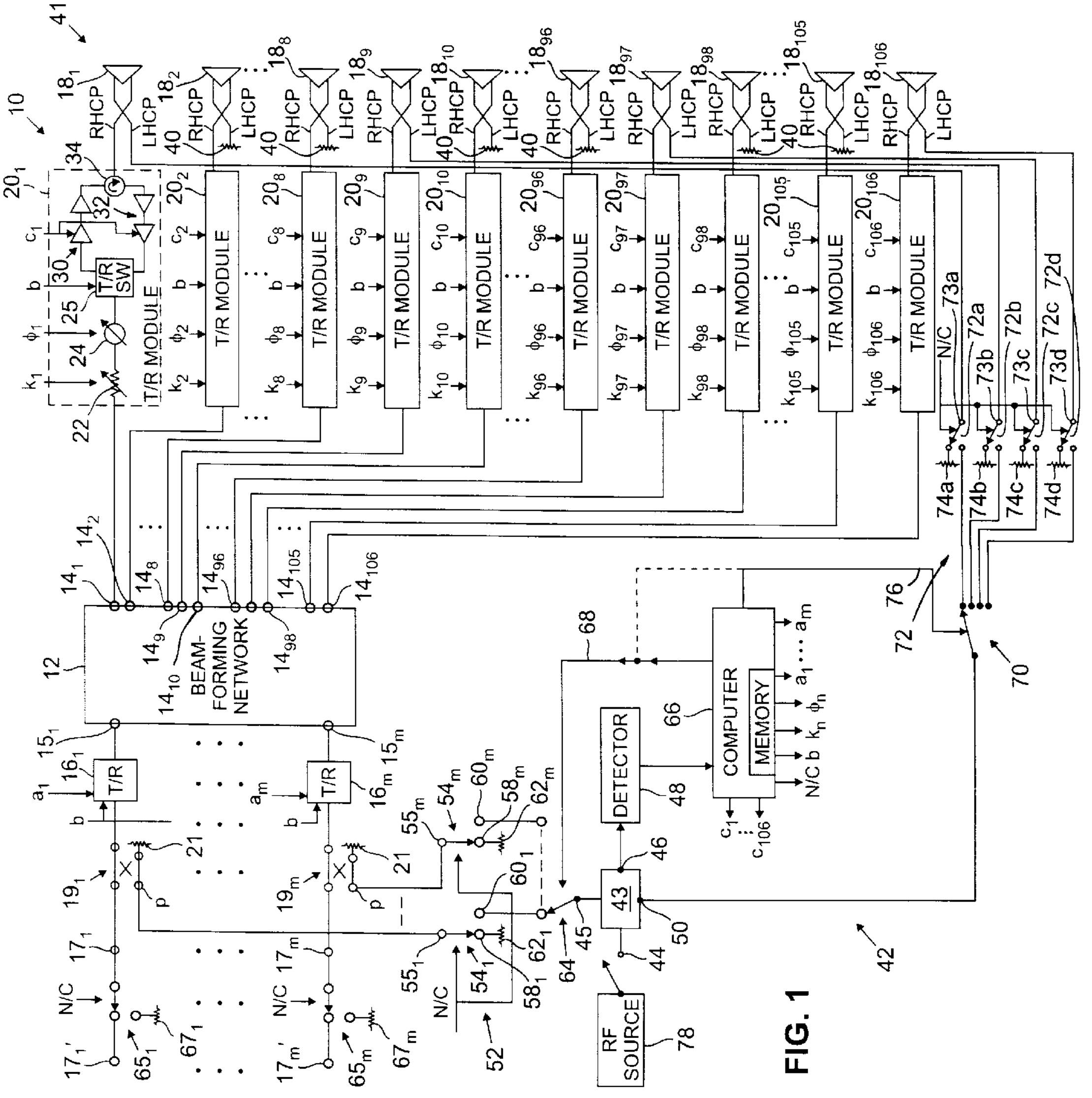
FIG. 1 is a block diagram of a phased array antenna system and calibration system therefore in accordance with the invention.

Referring now to FIG. 1, a phased array antenna system 10 is shown to include a beamforming network 12 having a plurality of, here one hundred and six, array ports $\mathbf{14}_1$–$\mathbf{14}_{106}$ and a plurality of, here m, beam ports $\mathbf{15}_1$–$\mathbf{15}m$. Each one of the beam ports $\mathbf{15}_1$–$\mathbf{15}_m$ is coupled to a corresponding one of a plurality of antenna ports $\mathbf{17}_1$–$\mathbf{17}_m$ through a corresponding one of a plurality of transmit/receive amplifier sections $\mathbf{16}_1$–$\mathbf{16}_m$, respectively, and a corresponding one of a plurality of directional couplers $\mathbf{19}_1$–$\mathbf{19}_m$, respectively, as indicated. Each one of the directional couplers $\mathbf{19}_1$–$\mathbf{19}_m$ has one port terminated in a matched load, 21, as indicated. Each one of the amplifier sections $\mathbf{16}_1$–$\mathbf{16}_m$ may be individually gated "on" (i.e., activated) or "off" in response to a control signal on a corresponding one of a plurality of lines $a_1$–$a_m$, respectively, as indicated. Further, the plurality of amplifier sections $\mathbf{15}_1$–$\mathbf{15}_m$ may be placed in either a receive state or a transmit state selective in response to a control signal on line b. (This may be performed by a transmit/receive (T/R) switch, not shown, included in each of the amplifier sections $\mathbf{16}_1$–$\mathbf{16}_m$.)

Each one of a plurality of, here one hundred and six, antenna elements $\mathbf{18}_1$–$\mathbf{18}_{106}$ is coupled to a corresponding one of the plurality of array ports $\mathbf{14}_1$–$\mathbf{14}_{106}$ through a corresponding one of a plurality of transmit/receive modules $\mathbf{20}_1$–$\mathbf{20}_{106}$, respectively, as shown. Each one of the plurality of transmit/receive modules $\mathbf{20}_1$–$\mathbf{20}_{106}$ is identical in construction and includes serially connected electronically controllable attenuator 22 and phase shifter 24, as shown. The attenuator 22 and phase shifter 24 are connected to a transmit/receive (T/R) switch 25 through a series of transmit amplifiers 30 in a transmit path and a series of receive amplifiers 32 in a receive path. Each of the T/R switches is controlled by the control signal on line b (which is also fed to the amplifier sections $\mathbf{16}_1$–$\mathbf{16}_m$, as described above). Each one of the amplifiers 30, 32 is gated "on" (i.e., activated) or "off" by a control signal on a corresponding one of the lines $c_1$–$c_{106}$, respectively, as indicated. The amplifiers 30, 32 are coupled to a circulator 34, as shown. The circulator 34 in each one of the transmit/receive modules $\mathbf{20}_1$–$\mathbf{20}_{106}$ is coupled to a corresponding one of the antenna elements $\mathbf{18}_1$–$\mathbf{18}_{106}$, respectively, as shown.

Figure 2:
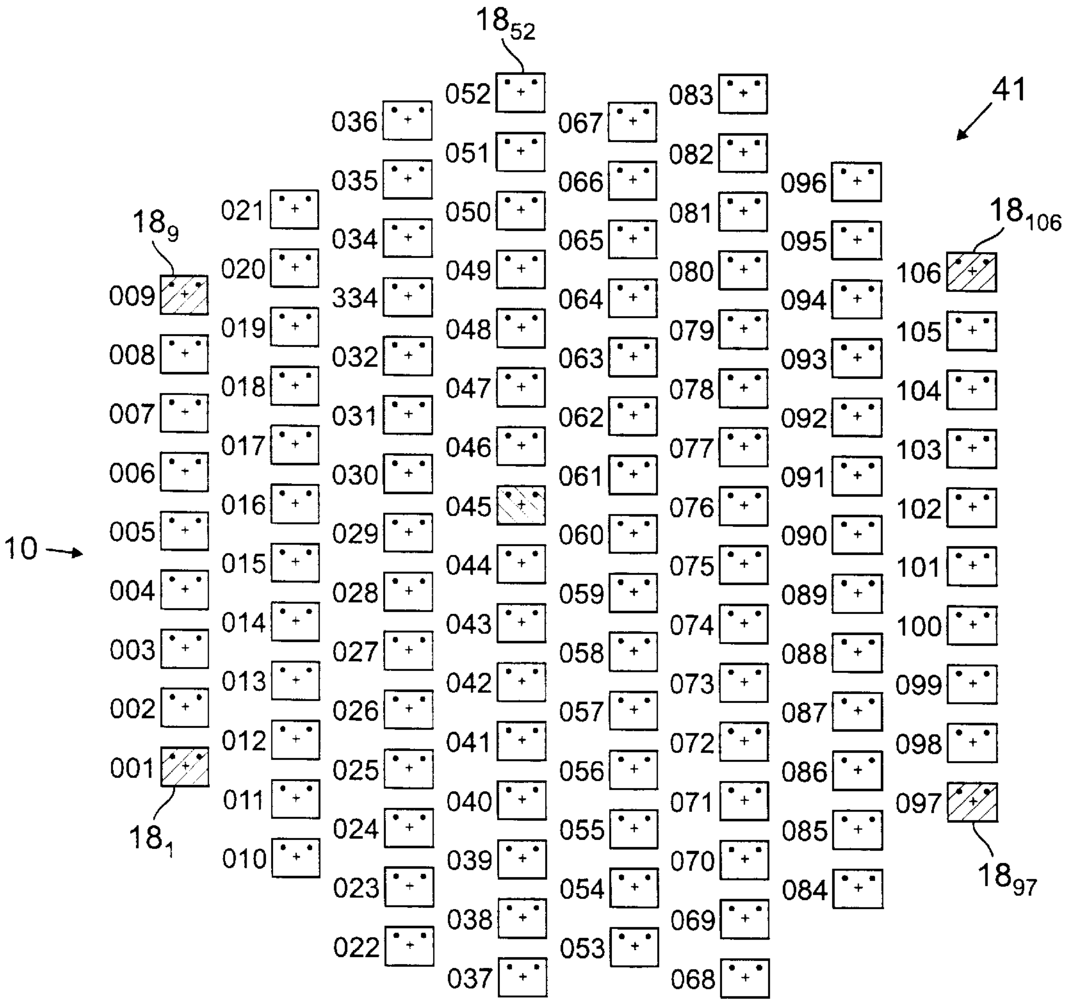
FIG. 2 is a front view of the aperture of the phased array antenna system of FIG. 1 in accordance with one embodiment of the invention.

More particularly, the radiating face of the array antenna 10 is shown in FIG. 2. Here, the array antenna includes one hundred and six antenna elements $\mathbf{18}_1$–$\mathbf{18}_{106}$ labeled 001 through 106, for example. Four of the antenna elements $\mathbf{18}_1$–$\mathbf{18}_{106}$, here the antenna elements labeled 001, 009, 097 and 106 are in predetermined positions at the periphery of the array face, for reasons to be discussed. Thus, here there are eight staggered columns COL1–COL8 of antenna elements $\mathbf{18}_1$–$\mathbf{18}_{106}$, in this illustrative case.

Referring again to FIG. 1, each one of the antenna elements $\mathbf{18}_1$–$\mathbf{18}_{106}$ is here configured as a circularly polarized antenna element, for example. Therefore, each antenna element has a right-hand circular polarized feed (RHCP) and a left-hand circular polarized feed (LHCP). Here, each one of the right-hand circular polarized feeds (RHCP) is coupled to a corresponding one of the circulators 34, as shown. The left hand circular polarized feed (LHCP) of all but the predetermined four of the antenna elements $\mathbf{18}_1$–$\mathbf{18}_{106}$, here the antenna elements labeled 001, 009, 097 and 106 are terminated in matched load impedances 40, as indicated. These predetermined four of the antenna elements $\mathbf{18}_1$–$\mathbf{18}_{106}$ are calibration antenna elements and are mutually coupled to the plurality of antenna elements $\mathbf{18}_1$–$\mathbf{18}_{106}$ through the antenna aperture 41. The calibration elements $\mathbf{18}_1$–$\mathbf{18}_{106}$ may be arranged in either edge (illustrated) or cluster arrangements, in order to minimize the calibration errors and maximize the antenna operation in "normal" mode. In the edge coupled configuration, calibration elements occupy the outer edge of the antenna aperture, while in a cluster arrangement, the aperture is subdivided into separate regions or clusters, with calibration elements at the centers. The calibration elements $\mathbf{18}_1$–$\mathbf{18}_{106}$ may use orthogonal circularly polarized ports (illustrated) of a directional coupler, or dedicated elements as the calibration element port. Dedicated elements are used as calibration elements and are not used in "normal" mode, being connected to the calibration components and not to the "normal" component chain. When used as orthogonal circularly polarized ports in an edge arrangement, the left hand circular polarized feed (LHCP) of the predetermined four of the calibration antenna elements $\mathbf{18}_1$–$\mathbf{18}_{106}$, here the antenna elements $\mathbf{18}_1$, $\mathbf{18}_9$, $\mathbf{18}_{97}$; and $\mathbf{18}_{106}$ (i.e., labeled 001, 009, 097 and 106) are coupled to a calibration system 42, as indicated.

More particularly, the calibration system 42 includes a switch 43 having: an RF input port 44; a beamforming network port 45; an RF detector port 46; an RF detector 48 coupled to the RF detector port 46; and an antenna element port 50. A switch section 52 is provided. The switch section 52 has a plurality of switches $\mathbf{54}_1$–$\mathbf{54}_m$, each one having a first terminal $\mathbf{55}_1$–$\mathbf{55}_m$, respectively, coupled to a port, P, of a corresponding one of the directional couplers $\mathbf{19}_1$–$\mathbf{19}_m$, respectively, as indicated. Each one of the switches $\mathbf{54}_1$–$\mathbf{54}_m$ is adapted to couple first terminals $\mathbf{55}_1$–$\mathbf{55}_m$ to either second terminals $\mathbf{58}_1$–$\mathbf{58}_m$ or third terminals $\mathbf{60}_1$–$\mathbf{60}_m$, respectively, as indicated, selectively in response to a control signal on "normal mode"/"calibration mode" line N/C, as shown. Each of the second terminals $\mathbf{58}_1$–$\mathbf{58}_m$ is coupled to a matched load $\mathbf{62}_1$–$\mathbf{62}_m$, respectively, as shown and each one of the third terminals $\mathbf{60}_1$–$\mathbf{60}_m$ is coupled to a selector switch 64, as indicated. The operation of the switches 52 and 64 will be described in more detail hereinafter. Suffice it to say here, however, that when in the normal operating mode, computer 66 produces a control signal on line N/C to thereby enable switches $\mathbf{54}_1$–$\mathbf{54}_m$ to couple terminals $\mathbf{55}_1$–$\mathbf{55}_m$ to matched loads $\mathbf{62}_1$–$\mathbf{62}_m$. On the other hand, when in the calibration mode, computer 66 produces a control signal on line N/C to thereby enable switches $\mathbf{54}_1$–$\mathbf{54}_m$ to couple terminals $\mathbf{55}_1$–$\mathbf{55}_m$ to terminals $\mathbf{60}_1$–$\mathbf{60}_m$; i.e., to inputs of the selector switch 64. (It should also be noted that during the calibration mode, antenna ports $\mathbf{17}_1$–$\mathbf{17}_m$ are coupled, via switches $\mathbf{65}_1$–$\mathbf{65}_m$, to matched loads $\mathbf{67}_1$–$\mathbf{67}_m$, respectively, as indicated; otherwise, as in the normal node, switches $\mathbf{65}_1$–$\mathbf{65}_m$ couple antenna ports $\mathbf{17}_1$–$\mathbf{17}_m$ to ports $\mathbf{17'}_1$–$\mathbf{17'}_m$, respectively, as shown.)

When in the calibration mode, the computer 66 produces a control signal on bus 68 so that beamforming network port 45 becomes sequentially coupled, through switch 64, to terminals $\mathbf{60}_1$–$\mathbf{60}_m$. Here, each one of the terminals $\mathbf{60}_1$–$\mathbf{60}_m$ is, because of the operation of switch 64, coupled to beamforming network port 45 for a period of time, T.

It is also noted, for reasons to be described hereinafter, that when terminals $\mathbf{60}_1$–$\mathbf{60}_m$ become sequentially coupled to beamforming network port 45, the computer 66 produces the control signals on lines $a_1$–$a_m$ to sequentially activate a corresponding one of the transmit/receive amplifier sections $\mathbf{16}_1$–$\mathbf{16}_m$. Thus, when terminals $\mathbf{60}_1$–$\mathbf{60}_m$ become sequentially coupled to port 45, modules $\mathbf{16}_1$–$\mathbf{16}_m$ become sequentially activated in synchronism therewith. The result is that port 45 becomes sequentially electrically coupled to beam ports $\mathbf{15}_1$–$\mathbf{15}_m$ for each of m periods of time, T.

It should also be noted that during the calibration mode, the computer 66 produces signals on lines $c_1$–$c_{106}$ to sequentially activate transmit/receive modules $\mathbf{20}_1$–$\mathbf{20}_{106}$, respectively, during each of the periods of time, T. Thus, for example, when port 45 is coupled to beam port $\mathbf{15}_1$ for the period of time T, the modules $\mathbf{20}_1$–$\mathbf{20}_{106}$ become sequentially activated for a period of time T/106, or less. Thus, during each one of the m periods of time, T, the antenna elements $\mathbf{18}_1$–$\mathbf{18}_{106}$ become sequentially electrically coupled to array ports $\mathbf{14}_1$–$\mathbf{14}_{106}$, respectively.

As noted above, each one of the antenna elements $\mathbf{18}_1$–$\mathbf{18}_{106}$ has a pair of feeds; an RHCP feed and an LHCP feed. As described above, each one of the LHCP feeds, except for those of antenna elements $\mathbf{18}_1$, $\mathbf{18}_9$, $\mathbf{18}_{97}$ and $\mathbf{18}_{106}$ are terminated in matched loads 40, as indicated. The LHCP feeds of antenna elements $\mathbf{18}_1$, $\mathbf{18}_9$, $\mathbf{18}_{97}$ and $\mathbf{18}_{106}$ are coupled to a selector switch 70 though a switching network 72, as indicated. More particularly, the switching network 72 includes switches 72*a*–72*d* having: first terminals 73*a*–73*d* coupled to the LHCP feeds of antenna elements $\mathbf{18}_1$, $\mathbf{18}_9$, $\mathbf{18}_{97}$ and $\mathbf{18}_{106}$, respectively, as shown; second terminals coupled to matched loads 74*a*–74*d*, respectively, as shown; and third terminals coupled to selector switch 70, as shown. During the normal mode, the switches 72*a*–72*d*, in response to the signal on line N/C (described above) terminate the LHCP feeds of antenna elements $\mathbf{18}_1$, $\mathbf{18}_9$, $\mathbf{18}_{97}$ and $\mathbf{18}_{106}$ in matched loads 74*a*–74*d*, respectively. During the calibration mode, the LHCP feeds of antenna elements $\mathbf{18}_1$, $\mathbf{18}_9$, $\mathbf{18}_{97}$ and $\mathbf{18}_{106}$ are coupled to selector switch 70, as indicated. The function of selector switch 70 will be described in more detail hereinafter. Suffice it to say here however that four predetermined calibration antenna elements $\mathbf{18}_1$, $\mathbf{18}_9$, $\mathbf{18}_{97}$ and $\mathbf{18}_{106}$ are used for redundancy. That is, the calibration, to be described, may be performed using only one of the four predetermined calibration antenna elements $\mathbf{18}_1$, $\mathbf{18}_9$, $\mathbf{18}_{97}$ and $\mathbf{18}_{106}$; however, in case of a failure in one, any of the three others may be used. The one of the four predetermined calibration antenna elements $\mathbf{18}_1$, $\mathbf{18}_9$, $\mathbf{18}_{97}$ and $\mathbf{18}_{106}$ to be used is selected by a control signal produced by the computer 66 on bus 76.

Figure 3:
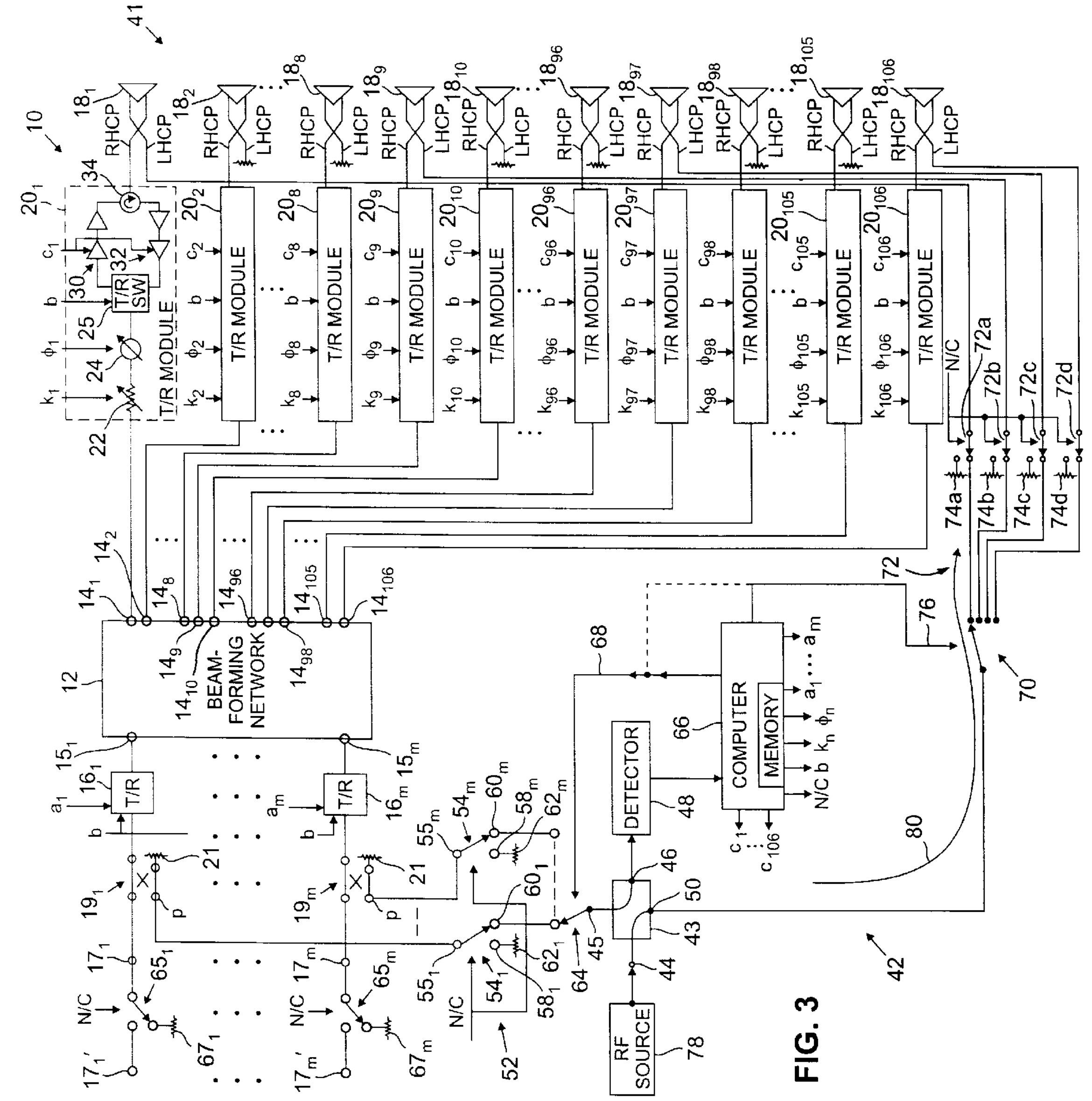
FIG. 3 is a block diagram of the phased array antenna system and calibration system therefore of FIG. 1 shown in the receive calibration mode.
Figure 4:
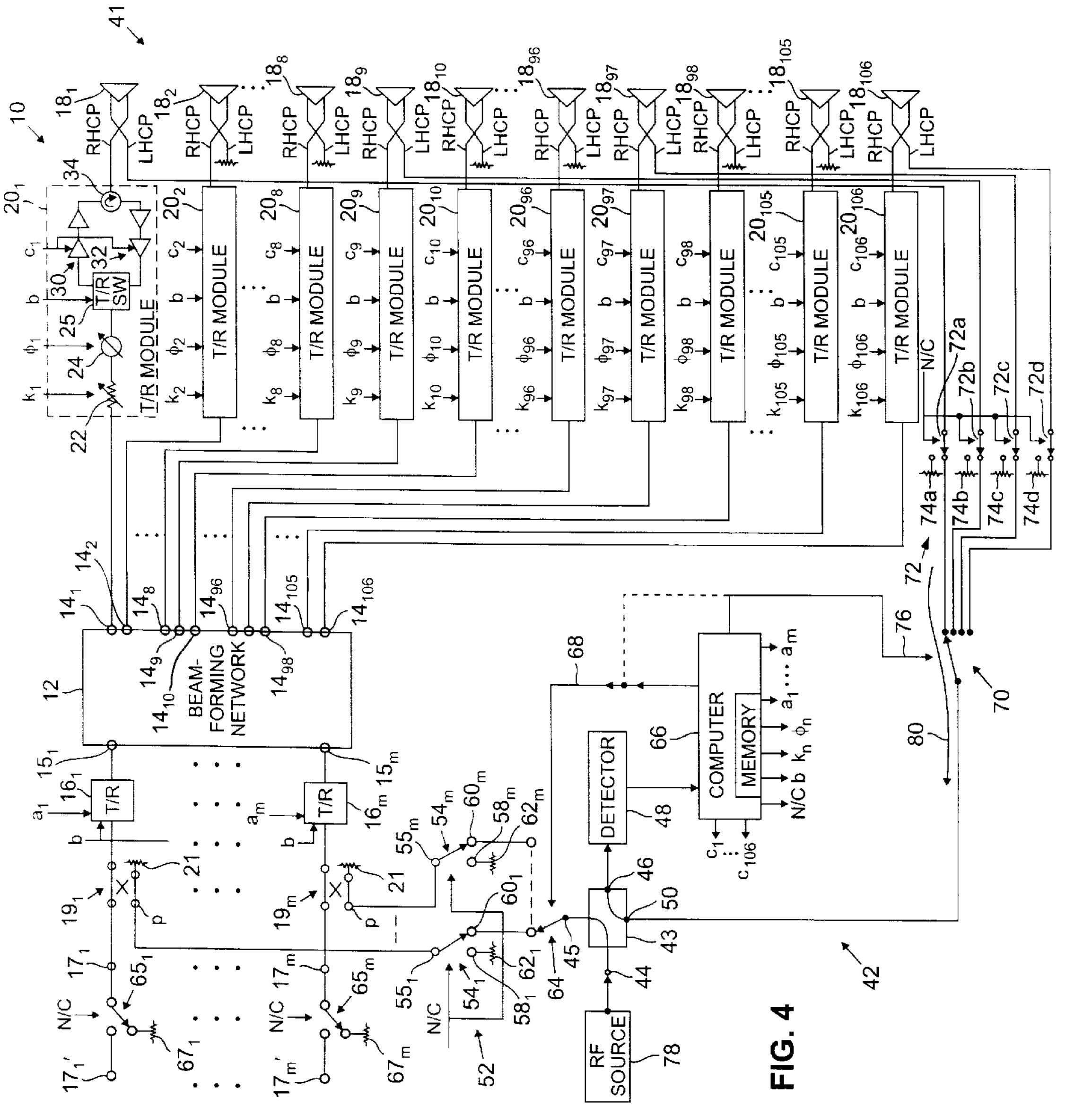
FIG. 4 is a block diagram of the phased array antenna system and calibration system therefore of FIG. 1 shown in the transmit calibration mode.

It should be noted that calibration is performed for both a transmit mode and for a receive mode. During the receive calibration mode RF energy from source 78 is fed to one of the four predetermined calibration antenna elements $\mathbf{18}_1$, $\mathbf{18}_9$, $\mathbf{18}_{97}$ and $\mathbf{18}_{106}$. For example, and referring to FIG. 3, RF source 78 is coupled through ports 44 and 50 of switch 43 and switch 76 selects one of the calibration antenna elements, here, for example, element $\mathbf{18}_1$. It is noted that in the receive calibration mode, switch 43 is configured as indicated; i.e., with port 44 being electrically coupled to port 50 and with port 45 being electrically coupled to port 46. In the transmit calibration mode, as shown in FIG. 4, switch 43 is configured as indicated; i.e., with port 44 (which is electrically coupled to the RF source 78) being electrically coupled to port 45 and with port 46 being electrically coupled to port 50.

Thus, in summary, during the calibration mode, the calibration system 42 sequentially couples each one of the antenna elements $\mathbf{18}_1$–$\mathbf{18}_{106}$ through the beamforming network 12 and the one of the transmit/receive modules $\mathbf{20}_1$–$\mathbf{20}_{106}$ coupled thereto selectively to either: (a) the detector port 46 during a receive calibration mode, as indicated in FIG. 3; or, (b) to the port 44 during a transmit calibration mode (FIG. 4). The switch section 42 includes the selector switch 70 for selectively coupling the left-hand circular polarized feed (LHCP) of one of the four predetermined calibration antenna elements labeled 001, 009, 097 and 106 in FIG. 1, during each test mode selectively to either: (a) the port 44 during the receive calibration mode, as shown in FIG. 3, through a path 80 isolated from the beamforming network 12; or, (b) to the detector port 46 during the transmit calibration mode, as shown in FIG. 4, through the path 80 isolated from the beamforming network 12.

It is noted that the four predetermined calibration antenna elements $\mathbf{18}_1$, $\mathbf{18}_9$, $\mathbf{18}_{97}$ and $\mathbf{18}_{106}$ may be disposed in a peripheral region of the array of antenna elements (FIG. 2). With such an arrangement, the dynamic range of the RF signals coupled to the RF detector are minimized for the operating modes of the antenna.

Consider now the calibration of the phased array antenna 10, at the factory, or test facility, during a receive calibration mode. Here, the RF source 78 is decoupled from port 44, such port 44 being terminated in a matched load, not shown. Switches $\mathbf{54}_1$–$\mathbf{54}_m$, switches $\mathbf{72}_1$–$\mathbf{72}_d$ and switches $\mathbf{65}_1$–$\mathbf{65}_m$ are placed in the normal mode thereby: (1) terminating the ports P of directional couplers $\mathbf{19}_1$–$\mathbf{19}_m$ in matched loads $\mathbf{62}_1$–$\mathbf{62}_m$, respectively; (2) terminating the LHCP feeds of antenna elements $\mathbf{18}_1$, $\mathbf{18}_9$, $\mathbf{18}_{97}$ and $\mathbf{18}_{106}$ in matched loads 74*a*–74*d*, respectively; and electrically coupling antenna ports $\mathbf{17}_1$–$\mathbf{17}_m$ to ports $\mathbf{17'}_1$–$\mathbf{17'}_m$, respectively. A source of radio frequency (RF) energy, not shown, is placed in the near field of the phased array aperture 41. One of the transmit/receive amplifier sections $\mathbf{16}_1$–$\mathbf{16}_m$ for example section $\mathbf{16}_1$, is activated and placed in the receive mode. The transmit/receive modules $\mathbf{20}_1$–$\mathbf{20}_{106}$ are placed in the receive mode and are sequentially activated. When each one of the transmit/receive modules $\mathbf{20}_1$–$\mathbf{20}_{106}$ is placed in a receive mode and is activated, energy received by the antenna element coupled thereto is passed through the activated transmit/receive module $\mathbf{20}_1$–$\mathbf{20}_{106}$ and through the beamforming network 12. The energy at one of the ports $\mathbf{17'}_1$–$\mathbf{17'}_m$, here in this example port $\mathbf{17'}_1$ is detected during the sequential activation by a detector, not shown, coupled to port $\mathbf{17'}_1$. The magnitude and phase of the detected energy at port $\mathbf{17'}_1$ is recorded. The process is repeated for each of the other ports $\mathbf{17'}_2$–$\mathbf{17'}_m$. For each one of the antenna elements $\mathbf{18}_1$–$\mathbf{18}_{106}$, a least mean square average is calculated for the detected energy associated with each of the m ports $\mathbf{17'}_1$–$\mathbf{17'}_m$. Thus, after the least mean square averaging, each one of the antenna elements $\mathbf{18}_1$–$\mathbf{18}_{106}$ is associated with an amplitude and phase vector. Each one of the one hundred and six measured/post-calculated receive vectors are compared with corresponding ones of one hundred and six pre-calculated, designed receive vectors. If the antenna is operating properly (i.e, in accordance with its design), the measured/post-calculated receive vectors should match the pre-calculated receive vectors, within a small error. Any difference in such measured/post-calculated receive vector and the pre-calculated receive vector for each of the one hundred and six antenna elements is used to provide a control signal to the controllable attenuator 22 and/or phase shifter 24 in the transmit/receive module 20$_1$–20$_{106}$ coupled to such one of the antenna elements 18$_1$–18$_{106}$, respectively, to provide a suitably corrective adjustment during the antenna's receive mode. After the corrective adjustments have been made, the antenna system 10 is calibrated for the receive mode.

The calibration is performed in like, reciprocal manner, during a transmit calibration mode at the factory or test facility. That is, a receiving antenna, not shown, is placed in the near field of the phased array antenna elements. The transmit/receive modules 20$_1$–20$_{106}$ are sequentially activated with an RF source, not shown, fed to one of the ports 17'$_1$–17'$_m$, for example port 17'$_1$. When each one of the transmit/receive modules 20$_1$–20$_{106}$ is placed in a transmit mode and is activated, energy is transmitted by the antenna element 18$_1$–18$_{106}$ coupled thereto and received by the receiving antenna, not shown. The energy received at the receiving antenna, not shown, is detected during the sequential activation. The amplitude and phase of the detected energy is recorded and one hundred and six transmit vectors are calculated; one for each of the antenna elements 18$_1$–18$_{106}$. The process is repeated with the RF being coupled sequentially to each of the other ports 17'$_2$–17'$_m$. Thus, after all m ports have been used, each one of the antenna elements 18$_1$–18$_{106}$ will have associated with it a set of m transmit vectors. The m transmit vectors in each set are least mean square averaged to produce, for each one of the antenna elements 18$_1$–18$_{106}$ a measured/post-calculated transmit vector. These measured/post-calculated transmit vectors are compared with pre-calculated, designed transmit vectors. If the antenna is operating properly (i.e, in accordance with its design), the measured/post-calculated transmit vectors should match the pre-calculated transmit vectors, within a small error. Any difference in such measured/post-calculated transmit vector and the pre-calculated transmit vector for each of the one hundred and six antenna elements is used to provide a control signal to the controllable attenuator 22 and/or phase shifter 24 in the transmit/receive module 20$_1$–20$_{106}$ coupled to such one of the antenna elements 18$_1$–18$_{106}$, respectively, to provide a suitably corrective adjustment during the antenna's transmit mode. After the corrective adjustments have been made, the antenna system 10 is calibrated for the transmit mode.

Once the attenuators and/or phase shifters have been corrected for both the transmit and receive modes, and with the phased array system still in the factory, or test facility, as the case may be (i.e., shortly after the above just-described calibration procedure) the calibration system 42 is coupled to the antenna system, as described in connection with FIGS. 1, 3 and 4 to determine the coupling coefficients between each one of the plurality of antenna elements 18$_1$–18$_{106}$ and each one of the four predetermined calibration antenna elements 18$_1$, 18$_9$, 18$_{97}$ and 18$_{106}$. Thus, during the receive calibration mode described in connection with FIG. 3, RF source 78 is coupled through ports 44 and 50 of switch 43 and switch 70 selects one of the calibration antenna elements, here, for example, element 18$_1$. It is noted that in the receive calibration mode, switch 43 is configured as indicated; i.e., with port 44 being electrically coupled to port 50 and with port 45 being electrically coupled to port 46. The switch 70 couples the RF source 78 to one of the four calibration antenna elements 18$_1$, 18$_9$, 18$_{97}$ and 18$_{106}$, here for example, antenna element 18$_1$. The energy is transmitted by antenna element 18$_1$ and is coupled to the antenna elements 18$_1$–18$_{106}$ through mutual coupling at the antenna aperture 41. Concurrently, each one of the amplifier sections 16$_1$–16$_m$ is activated and the switching section 64 operates as described above to sequentially couple each one of the beam ports 15$_1$–15$_m$ to port 45 for the period of time, T. During each of the m periods of time T, the modules 20$_1$–20$_{106}$ are sequentially activated and placed in a receive mode so that detector 48 produces, for each one of the one hundred and six antenna elements 18$_1$–18$_{106}$ amplitude and phase receive vectors. Each m phase vectors associated for each one of the antenna elements 18$_1$–18$_{106}$ are least mean square averaged to produce a receive vector for each one of the antenna elements. Because the antenna 10 had just been calibrated, these "calibrated" receive vectors provide a standard against which deviations in the future may be measured. These "calibrated" receive vectors are stored in a memory in computer 66. The process is repeated for the other three calibration antenna elements 18$_1$, 18$_9$, 18$_{97}$ and 18$_{106}$. Thus, at the end of this receive calibration mode, the memory in computer 66 stores four sets of "calibrated" receive vectors, one set for each of the four calibration antenna elements 18$_9$, 18$_{97}$ and 18$_{106}$.

The calibration system is then placed in the transmit calibration mode described above in connection with FIG. 4. The RF source 78 is coupled through ports 44 and 45 to switch 64 and port 50 is coupled to switch 70. Switch 70 selects one of the calibration antenna elements, here, for example, element 18$_1$. It is noted that in the transmit calibration mode, switch 43 is configured as indicated; i.e., with port 44 being electrically coupled to port 45 and with port 50 being electrically coupled to port 46. The switch 70 couples the detector 48 to one of the four calibration antenna elements 18$_1$, 18$_9$, 18$_{97}$ and 18$_{106}$, here for example, antenna element 18$_1$. Concurrently, each one of the amplifier sections 16$_1$–16$_m$ is activated and the switching section 64 operates as described above to sequentially couple each one of the beam ports 15$_1$–15$_m$ to the RF source 78 for the period of time, T. During each of the m periods of time T, the modules 20$_1$–20$_{106}$ are sequentially activated and placed in a transmit mode so that detector 48 produces, for each one of the one hundred and six antenna elements 18$_1$–18$_{106}$ m amplitude and phase transmit vectors. Each m phase vectors associated for each one of the antenna elements 18$_1$–18$_{106}$ are least mean square averaged to produce a transmit vector for each one of the antenna elements. Because the antenna 10 had just been calibrated, these "calibrated" transmit vectors provide a standard against which deviations in the future may be measured. These "calibrated" transmit vectors are stored in a memory in computer 66. The process is repeated for the other three calibration antenna elements 18$_9$, 18$_{97}$ and 18$_{106}$. Thus, at the end of this transmit calibration mode, the memory in computer 66 stores four sets of "calibrated" transmit vectors, one set for each of the four calibration antenna elements 18$_1$, 18$_9$, 18$_{97}$ and 18$_{106}$.

After the antenna system 10 has operated in the field for a sufficient period of time where re-calibration is required, the calibration system 42 is used to generate sets of "measured" transmit and receive vectors. These newly generated "measured" transmit and receive vectors are generated using the calibration system 42 in the same manner described above in the factory or test facility to produce the four sets of "calibrated" received vectors and four sets of "transmit"

vectors which are stored in the memory of computer 66. If the antenna system is in calibration, the four sets of "calibrated" receive vectors and the four sets of "transmit" vectors, stored in the memory of computer 66, should match the newly generated four sets of "measured" receive vectors and the four sets of "measured" transmit vectors within a small margin. Any substantial difference in any vector in the matrix is used to compute a gain and/or phase correction which is fed to the appropriate attenuator 22 and/or phase shifter 24 of the appropriate transmit/receive module $\mathbf{20}_1$–$\mathbf{20}_{106}$.

Figure 5:
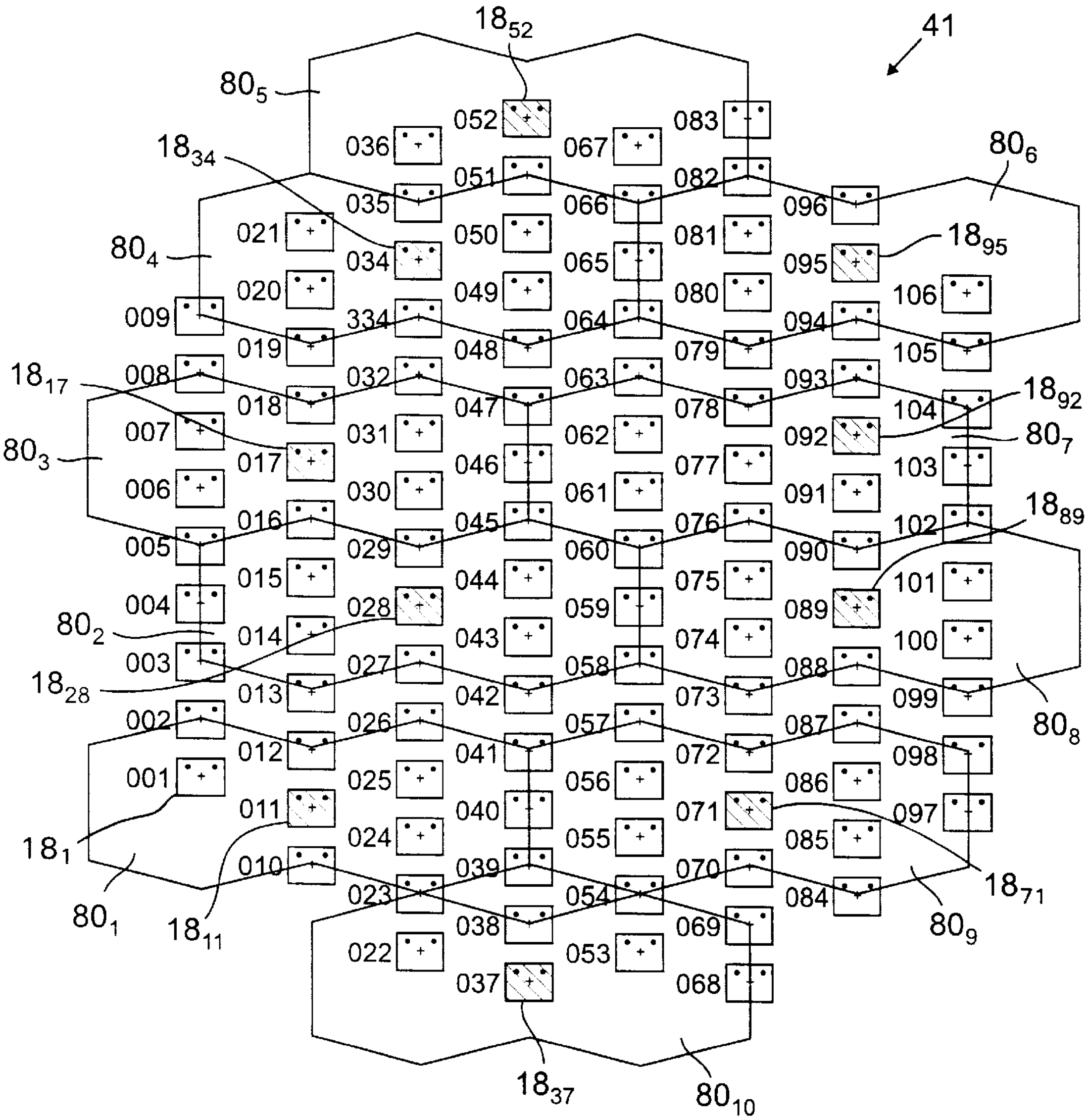
FIG. 5 is a front view of the aperture of the phased array antenna system of FIG. 1 in accordance with another embodiment of the invention.

Referring now to FIG. 5, an alternative positioning of the predetermined calibration antenna elements is shown. More particularly, here the one hundred and six antenna elements are arranged in ten clusters. The array has ten predetermined calibration antenna elements, i.e., the elements labeled 011, 017, 028, 034, 037, 052, 071, 089, 092, and 095 which are used as the predetermined calibration antenna elements described in connection with FIG. 2. More particularly, here the array of antenna elements $\mathbf{18}_1$–$\mathbf{18}_{106}$ is arranged in a plurality of, here ten, clusters $\mathbf{80}_1$–$\mathbf{80}_{10}$, as shown. Each one of the clusters $\mathbf{80}_1$–$\mathbf{80}_{10}$ has a predetermined one of ten calibration antenna elements, here antenna elements $\mathbf{18}_{11}$, $\mathbf{18}_{28}$, $\mathbf{18}_{17}$, $\mathbf{18}_{34}$, $\mathbf{18}_{52}$, $\mathbf{18}_{95}$, $\mathbf{18}_{92}$, $\mathbf{18}_{89}$, $\mathbf{18}_{71}$, and $\mathbf{18}_{37}$ for clusters $\mathbf{80}_1$–$\mathbf{80}_{10}$, respectively, as indicated. Thus, here switch 70, FIG. 1, would have ten inputs adapted for coupling to a corresponding one of the ten calibration antenna elements $\mathbf{18}_{11}$, $\mathbf{18}_{28}$, $\mathbf{18}_{17}$, $\mathbf{18}_{34}$, $\mathbf{18}_{52}$, $\mathbf{18}_{95}$, $\mathbf{18}_{92}$, $\mathbf{18}_{89}$, $\mathbf{18}_{71}$, and $\mathbf{18}_{37}$. For each one of the calibration antenna elements, a set of "calibrated" transmit vectors is generated for each of the antenna elements in its cluster and a set of "calibrated" receive vectors is generated for each of the antenna elements in its cluster. The "calibrated" vectors are stored in the memory of computer 66 to provide a standard for subsequent calibration. When calibration in the field is performed in the manner described above in connection with FIGS. 3 and 4, albeit with ten calibration antenna elements $\mathbf{18}_{11}$, $\mathbf{18}_{28}$, $\mathbf{18}_{17}$, $\mathbf{18}_{34}$, $\mathbf{18}_{52}$, $\mathbf{18}_{95}$, $\mathbf{18}_{92}$, $\mathbf{18}_{89}$, $\mathbf{18}_{71}$, and $\mathbf{18}_{37}$, a set of "measured" transmit vectors is generated for each of the antenna elements in its cluster and a set of "measured" receive vectors is generated for each of the antenna elements in its cluster. Differences are used to provide corrective signals to the attenuators 22 and phase shifters 24 as described above in connection with FIGS. 3 and 4.

With such an arrangement, each cluster is calibrated with the calibration antenna elements in such cluster thereby enabling a relatively small dynamic range variation among the antenna elements in such cluster during the calibration of such cluster.

Other embodiments are within the spirit and scope of the appended claims. For example, while circular antenna elements have been described, both circularly and linearly polarized antenna element apertures may be used. With a linearly polarized antenna which has either dual or single linearly polarized ports, (e.g. vertical and horizontal polarization for the dual linear case and either vertical or horizontal polarization for the single linearly polarized case), the calibration elements are connected to non-directional couplers, or electromagnetic magic tees where the main or largest coupling port is connected to the element and the transmit/receive module and the coupled port is connected to the calibration component chain. Calibration and "normal" operations are both available for this type of calibration element.

Further, the calibration elements may be arranged in edge or cluster geometries, or combinations of the two. These differing arrangements are chosen to minimize the calibration errors and maximize the "normal" operations. For example, in a small aperture antenna, having 300 elements or less, edge geometries are the most efficient to use. Conversely, with a large antenna aperture containing thousands of radiating elements, cluster arrangements are preferred.

Still further, the calibration element ports may use orthogonal circularly polarized, non-directional couplers, or dedicated coupling port configurations as needed. For example, where an antenna uses a single circular polarization in its "normal" mode, the orthogonal circular polarization is used as an effective coupling mechanism in the calibration element. For a right-hand circularly polarized (RHCP) aperture, the orthogonal circular polarization is left-hand circular polarization (LHCP). Alternatively, a non-directional coupler may be inserted between the calibration element and the transmit/receive module, as a means of providing the calibration element port. In yet another alternative, the element or a port or ports of an element may be dedicated to the calibration function such that the "normal" function for that element is unavailable.

Still further, the calibration test frequency and operation frequencies may be within the same set or may be in different sets. For example, where the operating frequency for a given antenna extends from frequency $f_{low}$ to $f_{high}$ the calibration frequency or frequencies may be single or multiple frequencies within the operating frequency range or may be outside that range, at frequencies $f_1$ or $f_2$ for example.

Also, the described calibration process is self contained. This means that additional equipment in the radiated field of the antenna is not needed or used. For example, external antennas, oscillators, receivers, antenna systems, or their equivalents are not employed. The apparatus used to calibrate the subject antenna system is contained within itself. An extension of the self contained calibration apparatus is that it tests the antenna components automatically. An on-board computer automatically runs a calibration algorithm that determines the operational state of the antenna with (on command) or without operator intervention. The calibration apparatus may generate failure maps and corrective action processes automatically as a part of its self calibration. This means that the calibration data determined by the calibration apparatus is analyzed by the on-board computer in conjunction with additional Built-In Test (BIT) data as needed, to determine component failures and deficiencies within the antenna system. These component failures are stored as failure maps, leading to three possible courses of action, 1) augmenting the complex (amplitude and phase) correction stored in the element transmit/receive module, or 2) applying complex corrections to all functional transmit/receive modules, or 3) disabling and reporting the failure to the operator for component replacement.

What is claimed is:

1. An antenna system, comprising:

a calibration system having: an RF input port; an RF detector port; an RF detector coupled to the RF detector port; and an antenna element port;

a beamforming network having a plurality of array ports and a plurality of beam ports;

a plurality of antenna elements grouped in clusters;

a plurality of transmit/receive modules, each one being coupled between a corresponding one of the antenna elements and a corresponding one of the array ports; and a switch section for sequentially coupling each one of the antenna elements through the beam forming network and the one of the transmit/receive modules coupled thereto selectively to either: (a) the detector port during a receive calibration mode; or, (b) to the RF input port during a transmit calibration mode;

wherein the switch section includes a switch for coupling a predetermined one of the antenna elements selectively to either: (a) the RF input of the calibration system during the receive calibration mode through a path isolated from the beamforming network; or, (b) to the detector port during the transmit calibration mode through a path isolated from the beamforming network; and wherein an antenna element coupled to the detector port during the receive calibration mode, or to the RF input port during the transmit calibration mode, and the predetermined one of the plurality of antenna elements are disposed in a common one of the clusters of the plurality of antenna elements.

2. The antenna system recited in claim 1 wherein the predetermined one of the antenna elements is different from at least one of the sequentially coupled antenna elements.

3. The antenna system recited in claim 1 further comprising a computer coupled to the RF detector and adapted to determine coupling coefficients between the antenna elements.

4. The antenna system recited in claim 1 wherein the antenna elements of each cluster are disposed adjacent to at least one other antenna element of such cluster.

5. The antenna system recited in claim 4 wherein the predetermined one of the antenna elements is substantially centrally disposed in the common one of the clusters.

6. The antenna system recited in claim 5 wherein the antenna elements of the common one of the clusters are symmetrically disposed about the predetermined one of the antenna elements.

7. The antenna system recited in claim 4 wherein the predetermined one of the antenna elements is disposed in the common one of the clusters to reduce a dynamic range variation between the predetermined one of the antenna elements and the other antenna elements of the common one of the clusters.

8. The antenna system recited in claim 1 wherein the predetermined one of the antenna elements is dual polarized.

9. A method for calibrating an antenna system having a plurality of antenna elements grouped in clusters, a beamforming network having a plurality of array ports and a plurality of beam ports, and a plurality of transmit/receive modules, each one being coupled to a corresponding one of the array ports and to a corresponding one of the plurality of antenna elements, comprising the steps of:

providing a calibration system having: an RF input port; an RF detector port; an RF detector coupled to the RF detector port; and an antenna element port;

sequentially coupling each one of the antenna elements in a selected one of the plurality of clusters of antenna elements through the beam forming network and the one of the transmit/receive modules coupled thereto selectively to either: (a) the detector port during a receive calibration mode; or, (b) the RF test input port during a transmit calibration mode; and coupling a predetermined one of the plurality of antenna elements in the selected cluster selectively to either: (a) the RF test input during the receive calibration mode through a path isolated from the beam forming network; or, (2) the detector port during the transmit calibration mode through a path isolated from the beam forming network.

10. The method recited in claim 9 wherein the predetermined one of the antenna elements is dual polarized.

11. The method recited in claim 9 wherein the predetermined one of the antenna elements is different from at least one of the sequentially coupled antenna elements.

12. The method recited in claim 9 further comprising determining coupling coefficients between the antenna elements.

* * * * *

UNITED STATES PATENT AND TRADEMARK OFFICE

CERTIFICATE OF CORRECTION

PATENT NO. : 6,252,542 B1
DATED : June 26, 2001
INVENTOR(S) : Sikina et al.

It is certified that error appears in the above-identified patent and that said Letters Patent is hereby corrected as shown below:

Title page,
ABSTRACT,
Lines 3, 22 and 24, delete "beamforming" and replace with -- beam-forming --.

Column 1,
Lines 17, 21, 22 and 34, delete "beamforming" and replace with -- beam-forming --.
Line 31, delete "module" and replace with -- modules --.

Column 2,
Line 8, delete "beamformers" and replace with -- beam formers --.
Line 32, delete "a beamforming" and replace with -- a beam-forming --.
Line 32, delete "The beamforming" and replace with -- The beam-forming --.
Line 39, delete "and RF" and replace with -- an RF --.
Lines 52 and 54, delete "beamforming" and replace with -- beam-forming --.

Column 3,
Line 23, delete "beamforming" and replace with -- beam-forming --.

Column 4,
Lines 12 and 34, delete "left hand" and replace with -- left-hand --.
Line 40, delete "beamforming" and replace with -- beam-forming --.

Column 5,
Lines 4, 7 and 11, delete "beamforming" and replace with -- beam-forming --.
Line 36, delete "though" and replace with -- through --.

Column 6,
Line 12, delete "beamforming" replace with -- beam-forming --.
Lines 24, 26 and 54, delete "beamforming" and replace with -- beam-forming --.

Column 8,
Line 23, delete "three" and replace with -- four --.
Line 27, delete "$18_9$, $18_{97}$, and $18_{106}$" and replace with -- $18_1$, $18_9$, $18_{97}$, and $18_{106}$ --.

Column 10,
Line 59, delete "beamforming" and replace with -- beam-forming --.

Column 11,
Lines 9 and 11, delete "beamforming" and replace with -- beam-forming --.

UNITED STATES PATENT AND TRADEMARK OFFICE

CERTIFICATE OF CORRECTION

PATENT NO. : 6,252,542 B1
DATED : June 26, 2001
INVENTOR(S) : Sikina et al.

It is certified that error appears in the above-identified patent and that said Letters Patent is hereby corrected as shown below:

Column 12,
Line 6, delete “beamforming” and replace with -- beam-forming --.

Signed and Sealed this

Ninth Day of July, 2002

Attest:

JAMES E. ROGAN

*Attesting Officer* *Director of the United States Patent and Trademark Office*